United States Patent [19]

Blackwelder

[11] 3,871,802

[45] Mar. 18, 1975

[54] DRESSING RING FOR TUBULAR EXPANDED POLYSTYRENE COOLING MANDREL

[75] Inventor: Maurice W. Blackwelder, Dix Hills, N.Y.

[73] Assignee: Owens-Illinois, Inc., Toledo, Ohio

[22] Filed: June 4, 1973

[21] Appl. No.: 366,265

[52] U.S. Cl.............. 425/72, 264/48, 425/326 R, 425/378 R, 425/387 R, 425/404, 425/817 C
[51] Int. Cl............................................ B29d 23/04
[58] Field of Search ......... 264/89, 94, 95, 209, 237, 264/47, 48; 425/4 C, 817 C, 72, 378, 379, 404, 325, 326 R, 387, 392, 393

[56] References Cited
UNITED STATES PATENTS 3,426,111  2/1969  Simpson......................... 425/308 X
3,765,808  10/1973  Lyon et al............................ 425/72

Primary Examiner—R. Spencer Annear
Assistant Examiner—Mark Rosenbaum
Attorney, Agent, or Firm—Thomas A. Meehan; Edward J. Holler

[57] ABSTRACT

A surface treating device to be attached to the upstream end of a cooling and sizing mandrel used in the manufacture of a web of expanded polystyrene of a general purpose grade from a warm, tubular extrudate of such material, such treating device serving to prepare the dense, radially innermost surface of such tubular extrudate so that it can be drawn over the cooled, cooling and sizing mandrel in tight, surface to surface contact therewith to substantially reduce the amount of material from the web which accumulates on the cooling and sizing mandrel.

3 Claims, 2 Drawing Figures

PATENTED MAR 18 1975 3,871,802

DRESSING RING FOR TUBULAR EXPANDED POLYSTYRENE COOLING MANDREL

BACKGROUND OF THE INVENTION

It is well known in the art that sheets or webs of expanded polystyrene, with opposed surfaces or "skins" of substantially greater density than the intermediate core have many desirable properties for many end product applications. For example, U.S. Pat. No. 3,468,467 to S. W. Amberg, which is now assigned to assignee of this application, shows a nestable, two-piece disposable drinking cup for hot beverages in which the sidewall element is fabricated from a blank which is cut from a web of expanded polystyrene having dense surface skins, and copending application Ser. No. 159,443 of S. W. Amberg et al., which is assigned to the assignee of this application, now U.S. Pat. No. 3,760,968, shows a composite container comprised of an inner glass envelope and, attached to and surrounding the exterior thereof, a protective and externally decorated sleeve fabricated from a web of oriented polystyrene.

As is shown, for example, in U.S. Pat. No. 3,560,600 to V. L. Gliniecki, webs of expanded polystyrene having dense surface skins may be produced from warm, blowing agent-containing, tubular extrudates of such material by quickly chilling the inner and outer surfaces of the extrudate as it emerges from the die to inhibit further expansion of the residual blowing agent within the extrudate in the surface portions thereof, by allowing the residual blowing agent in the inner or core portion of the extrudate to continue to expand for some finite period of time, by drawing the extrudate over an internally cooled mandrel of greater diameter than the extrusion die to size the diameter of the tube and to cool substantially all remaining residual blowing agent, and by slitting the tube as it passes from the die along one or more longitudinally extending lines to form one or more webs therefrom. Such an arrangement will work reasonably well when the extrudate is comprised of a substantial portion of a rubber-modified, impact grade of polystyrene and/or when the end products to be formed from the webs of such polystyrene do not require that the mandrel or radially innermost surface of the extrudate be of high quality, for example, the quality required to permit attractive printing or decorating material to be placed thereon.

The tubular extrusion arrangement heretofore described can, however, lead to surface quality defects on the web surface which comprised the radially innermost or mandrel-contacting side of the extrudate from such web was formed. These defects can arise by the "plating out" or accumulation of material from the extrudate onto the mandrel by virtue of the tight, surface to surface contact between the extrudate and the mandrel which is required for proper cooling of the extrudate. Such accumulation of material, which has been found to be especially severe in the case of extrudates comprised of a substantial portion of general purpose grades of polystyrene because of the inherently brittle character of such grades, causes scratching or marring of the surface of the extrudate which passes thereover, and this is particularly objectionable when it is desired to subsequently apply printing or decorative material to such surface. To be able to operate at all according to such as arrangement with general purpose grades of polystyrene, it is necessary to very frequently shut the extrusion line down to permit the mandrel to be cleaned or sand blasted, and the costliness of such shutdowns substantially detracts from the economic advantages otherwise to be gained from the substitution of less expensive general purpose grades of polystyrene in applications where impact grades previously were used.

GENERAL DESCRIPTION OF THE INVENTION

In accordance with the present invention, however, there is provided a surface treating device which is attached to the upstream end of the cooling and sizing mandrel and which treats the radially innermost surface of the extrudate before it contacts the mandrel to substantially reduce the tendency for material from the extrudate to "plate out" on, or to transfer to, the mandrel, even when the extrudate is comprised of a substantial portion of a general purpose grade of polystyrene. Such a device comprises a metallic ring with a smooth, extrudate-contacting outer surface of approximately the same outside diameter as the outside diameter of the mandrel, which is mounted substantially concentrically with the mandrel and which is axially spaced in front of the mandrel by a short distance. The axial length of such ring is short, in relationship to the axial length of the mandrel. When such a ring is used, there is a substantial reduction in the tendency of material in the extrudate to adhere to the mandrel, such improvement being sufficient to permit the satisfactory production, over prolonged periods of time, of webs of expanded polystyrene of medium impact and general purpose grades with a printable, dense mandrel-contacting skin. It is thought that such improvement is derived from the mechanical "ironing" or "dressing" effect that the ring has on the normal irregularities in the extrudate surface which would otherwise lead to the adhesion of particles of material from such surface on to the mandrel surface, it being noted that the bearing pressure of such ring on the extrudate surface is probably somewhat greater than the bearing surface of the extrudate on the mandrel itself because of the relatively short axial length of the ring. It is also to be noted that the ring, being disposed away from the source of cooling from the mandrel, will probably run with a somewhat higher extrudate-contacting surface temperature than the mandrel, which may augment the mechanical ironing effect of the ring previously mentioned.

Accordingly, it is an object of the present invention to provide improved method and apparatus for the cooling of a tubular extrudate of expanded polystyrene, especially one comprised mainly of a general purpose grade of polystyrene, by the sliding contact of the dense inner surface or skin of such extrudate over a metallic cooling and sizing mandrel.

It is a further object of the present invention to provide method and apparatus for the production of a web of expanded polystyrene, especially one comprised mainly of a general purpose grade of polystyrene, such web having at least one surface or skin which is of substantially greater density than the interior or core region of such web and which is of a satisfactory quality to receive printing or decorative material to permit such surface to serve as the visible, outermost, decorated surface of drinking cups, glass container protective sleeves and the like.

It is a further object of the present invention to provide a web of expanded polystyrene, comprised mainly of a general purpose grade of polystyrene and having a relatively dense printable skin, which skin was the mandrel-contacting surface of a tubular extrudate from which such web was severed.

For a further understanding of the present invention and the objects thereof, attention is directed to the drawing, to the following description thereof to the detailed description of the invention and to the appended claims.

DETAILED DESCRIPTION OF THE INVENTION

Figure 1:
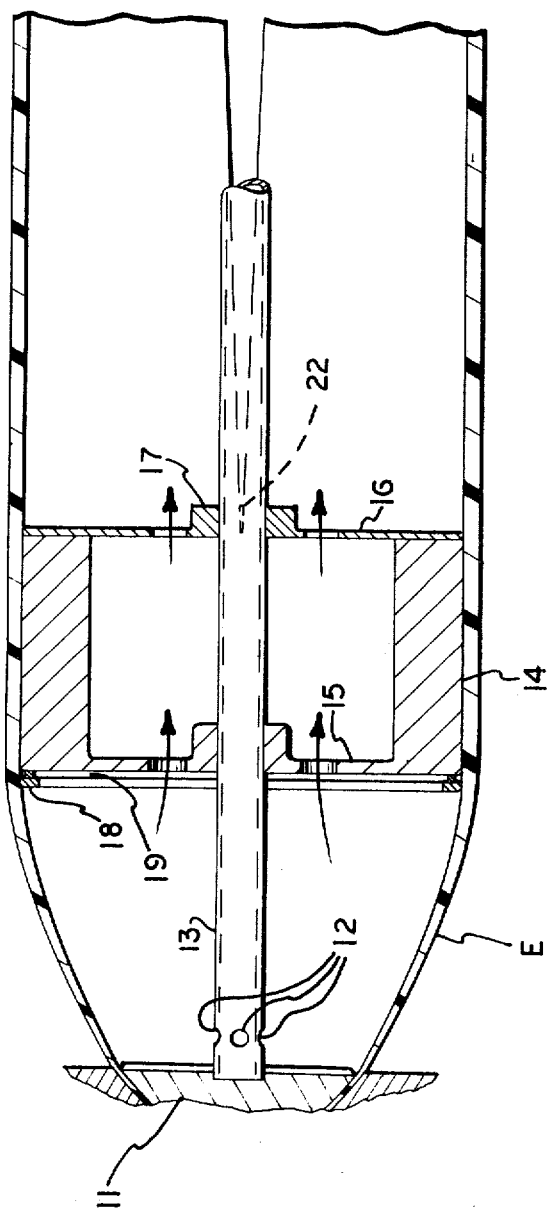
FIG. 1 is a fragmentary, elevational, cross-sectional view of apparatus which embodies the present invention and which is useful in the production of webs of expanded polystyrene.

As is well understood in the art, expanded polystyrene may be produced in the form of webs of sheets from a circular extrudate, and to this end, there is provided extrusion means comprising an annular extrusion die 11, shown fragmentarily, for extruding or expressing on a relatively continuous basis, a warm extrudate E of circular cross-section. The thickness of extrudate E is shown at an enlarged scale in the drawing for purposes of illustration. This extrudate contains residual blowing agent which expands when the pressure on the extrudate is released upon the exit of the extrudate from the die. Extrusion die 11 may advantageously be constructed in accordance with the teachings of copending application Ser. No. 2,005 in which I am a co-inventor with Victor E. Scotto and which is assigned to the assignee of this application, now U.S. Pat. No. 3,751,537. However, it is believed that the present invention can also be advantageously utilized in conjunction with other known types of extrusion dies.

As the warm extrudate E issues from extrusion die 11, at least the radially innermost surface thereof is quickly chilled, to prevent the reduction in density of the extrudate near this surface due to expansion of the blowing agent, by directing streams of cooling air or other fluid thereagainst from a circular array of ports 12 in a longitudinal fluid inlet and mounting pipe 13 which is disposed coaxially with extrusion die 11. Means, not shown, may also be provided to chill the radially outermost surface of extrudate E as it emerges from die 11 to form an outer "skin" thereon. The present invention may, however, be advantageously practiced with or without such means. In any event, the extrudate E with the chilled innermost surface is then passed over a sizing and cooling mandrel 14 which is mounted on pipe 13 somewhat downstream of extrusion die 11, which is of a larger diameter than the diameter of the extrusion orifice of die 11 to positively fix the final diameter of extrudate E and which is internally cooled (in conventional fashion by means not shown) to conductively cool the extrudate which is in surface to surface contact therewith and to thereby suppress its further foaming or expansion by expansion of residual blowing agent therein. As the extrudate traverses the finite distance from the extrusion die to the mandrel 14, the expansion of the blowing agent within the warm portions of the extrudate away from the chilled surface thereof will cause the thickness of these portions to increase, with a resulting decrease in the density thereof. It is to be noted that some prior art tubular expanded polystyrene extrusion arrangements, such as that shown in the aforesaid U.S. Pat. No. 3,560,600, maintain a thin film of air between the extrudate and the cooling mandrel, which prevents surface to surface contact therebetween. The present invention is inapplicable to such an arrangement, but is quite beneficial when the use of such an air film is intolerable, which is the case, for example, when the innermost surface of the extrudate must be of printable quality.

Mandrel 14 is of generally annular construction, the upstream and downstream portions being closed by ported plate-like members 15 and 16, member 15 preferably being cast integrally with the body of mandrel and member 16 preferably being a separate piece mounted on a thickened central hub 17. The ports in members 15 and 16 serve to vent to atmosphere the air or cooling fluid discharged through ports 12 against the extrudate, and the ports in members 15 and 16 are desirably sized to maintain some positive pressure against the inner surface of the extrudate to facilitate its expansion from the diameter of the extrusion die to the diameter of the mandrel.

Figure 2:
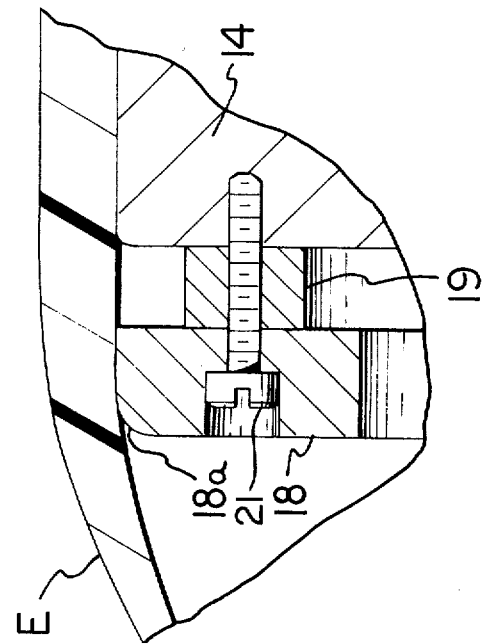
FIG. 2 is a fragmentary, elevational, cross-sectional view, at an enlarged scale, of a portion of the apparatus of FIG. 1.

To facilitate the surface to surface sliding movement of the extrudate over the mandrel, without the "plating off" of material from the extrudate onto the mandrel, as heretofore explained, there is provided an extrudate surface contacting ring 18 mounted substantially concentrically with mandrel 14 and having an outside diameter substantially equal to the outside diameter of the mandrel. Contacting ring has a rounded leading edge 18a and is axially separated from the upstream end of mandrel 14 by a spacer ring 19, whose outside diameter is less than that of contacting ring 18. Contacting ring may be maintained in the position shown by bolting it to the mandrel by means of a multiplicity of bolts 21, as shown in FIG. 2, each of which extends through spacer ring 19 into the mandrel.

After the cooled extrudate E emerges from the downstream end of mandrel 14 it is slit into one or more longitudinally extendings webs along an equal number of longitudinally extending lines by means of one or slitter blades 22, and each such web may be drawn through subsequent processing steps by conventional downstream winding rollers (not shown) which also serve to draw the extrudate over the cooling mandrel. In some instances, it may be desirable to treat the radially outermost surface of each such web in advance of such winding rollers in the manner suggested in my copending application Ser. No. 316,719, which is also assigned to the assignee of this application, for the purposes suggested in such copending application.

The invention has been found to be especially advantageous when producing foam webs comprised mainly of general purpose grades of polystyrene such as that sold by Koppers under the designation 8G and that sold by Dow Chemical under the designation XP–6041. The invention has been successfully practiced with such resins over a range of web thicknesses from 10–40 mils (0.010–0.040 inch) and over a range of average web densities from 10–20 pounds per cubic foot. In the production of foam webs comprised mainly of a medium impact grade of polystyrene, such as that sold by Dow Chemical under the designation 441, the invention has proved to be advantageous, in making less critical to proper operation, the maintenance of a high quality sand blasted finish on the extrudate contacting side of the cooling mandrel.

The best mode known to me to carry out this invention has been described above in terms sufficiently full, clear, concise and exact as to enable any person skilled in the art to make and use the same. It is to be understood, however, that it is within my contemplation that certain modifications of the above-described mode of practicing the invention can be made by a skilled artisan without departing from the scope of the invention and it is, therefore, desired to limit the invention only in accordance with the appended claims.

I claim:

1. In apparatus for producing a web of expanded polystyrene comprising an extruder for extruding a tubular extrudate, means for expanding the extrudate and a cooling mandrel over which the expanded extrudate is drawn in surface to surface contact therewith, the improvement comprising: a contacting ring for dressing the inside surface of the extrudate which is thin in the longitudinal direction relative to the mandrel, which has an extrudate-contacting outside surface which is positioned to contact the extrudate at a location where the extrudate has reached its final diameter, which is disposed substantially concentrically, with the mandrel and which is spaced longitudinally upstream of the cooling mandrel.

2. Apparatus according to claim 1 and further comprising a spacer ring which is thin in the longitudinal direction relative to the mandrel, which is disposed in the space between the contacting ring and the mandrel and which is substantially out of contact with the extrudate to thermally isolate the contacting ring from the means used to cool the cooling mandrel.

3. Apparatus according to claim 2 and further comprising fastener means extending through the spacer ring for attaching the contacting ring and the spacer ring to the mandrel.

* * * * *